US008690226B2

United States Patent
Ellis et al.

(10) Patent No.: US 8,690,226 B2
(45) Date of Patent: Apr. 8, 2014

(54) COST-EFFECTIVE, LIGHTWEIGHT, THERMOPLASTIC AUTOMOTIVE BODY STRUCTURE MANUFACTURED BY SINGLE STEP ROTO-MOLDING PROCESS

(75) Inventors: Thomas Stephen Ellis, Novi, MI (US); Nigel Giddons, Novi, MI (US); John William Taylor, Novi, MI (US); Kanu Chunilal Mehta, Novi, MI (US); Gavin John Stormer, Novi, MI (US); Kevin Fisher, Novi, MI (US)

(73) Assignee: Tata Technologies Pte Limited, Singapore (SG)

( * ) Notice: Subject to any disclaimer, the term of this patent is extended or adjusted under 35 U.S.C. 154(b) by 89 days.

(21) Appl. No.: 13/237,719

(22) Filed: Sep. 20, 2011

(65) Prior Publication Data
US 2012/0068496 A1   Mar. 22, 2012

(30) Foreign Application Priority Data

Sep. 21, 2010 (IN) .......................... 2630/MUM/2010

(51) Int. Cl.
*B62D 29/00* (2006.01)
(52) U.S. Cl.
USPC ...................................................... 296/181.2
(58) Field of Classification Search
USPC ................ 296/178, 204, 197, 203.03, 181.2, 296/203.01, 191; 428/98; 180/65.51; 105/397
See application file for complete search history.

(56) References Cited

U.S. PATENT DOCUMENTS

| 5,286,080 | A | 2/1994 | Ringdal et al. |
| 6,569,509 | B1 * | 5/2003 | Alts ................................ 428/73 |
| 6,588,785 | B2 | 7/2003 | Monary et al. |
| 7,025,166 | B2 * | 4/2006 | Thomas ........................ 180/311 |
| 7,287,797 | B1 | 10/2007 | Belloso et al. |
| 7,784,856 | B2 * | 8/2010 | Fuchs et al. .............. 296/187.08 |
| 7,862,101 | B2 * | 1/2011 | Lusk et al. .................... 296/178 |
| 2003/0230443 | A1 * | 12/2003 | Cramer et al. ............... 180/65.5 |
| 2006/0163910 | A1 * | 7/2006 | Behr .......................... 296/181.2 |
| 2008/0001429 | A1 * | 1/2008 | Willis et al. ................ 296/181.2 |
| 2009/0179461 | A1 * | 7/2009 | Fuchs et al. .................... 296/204 |
| 2010/0320794 | A1 * | 12/2010 | Maceri et al. .............. 296/37.15 |
| 2011/0057476 | A1 * | 3/2011 | Beck et al. ................. 296/181.2 |
| 2011/0095574 | A1 * | 4/2011 | Brown .......................... 296/204 |
| 2012/0017754 | A1 * | 1/2012 | Joynt .......................... 89/36.02 |

FOREIGN PATENT DOCUMENTS

EP       286058 A2 * 10/1988   ............. B29C 67/14

* cited by examiner

*Primary Examiner* — Glenn Dayoan
*Assistant Examiner* — Pinel Romain
(74) *Attorney, Agent, or Firm* — Schmeiser, Olsen & Watts LLP

(57) ABSTRACT

The invention provides a structure for automotive vehicle manufactured by rotational molding process having enough stiffness, strength and durability to sustain the weight of passengers without requiring any supporting sub-frames. The multilayer structure along with foam layer is used to provide additional impact strength and reliability to the structure of the vehicle against accidents. The single step production of structurally complex shaped body parts for automotive vehicle enables economic manufacturing and assembly of the automotive vehicle.

8 Claims, 11 Drawing Sheets

COST-EFFECTIVE, LIGHTWEIGHT, THERMOPLASTIC AUTOMOTIVE BODY STRUCTURE MANUFACTURED BY SINGLE STEP ROTO-MOLDING PROCESS

CROSS REFERENCE TO RELATED APPLICATION

This application claims priority to Indian Patent Application to Ellis, et al., serial number 2630/MUM/2010, filed Sep. 21, 2010, the disclosure of which is hereby incorporated entirely herein by reference

BACKGROUND

1. Field of the Invention

The present invention relates to automobile industry, more particularly the present invention relates to cost effective, time efficient fabrication of automotive body structures.

2. State of the Art

Conventionally the body structure and other parts of vehicle like chassis are constructed by assembling, mostly through welding, various pre-formed sheet steel panels to create the body structure of the vehicle, and then bolting the body to a supporting metal framework known as the chassis. Another well known method in the state of the art is to construct the body and the chassis together as a monocoque, i.e., the body and chassis are in one piece. Although both methods produce high quality vehicles, these methods have several disadvantages. These manufacturing processes are complex and expensive. The above mentioned methods involve number of steps including the stamping of each body and chassis part and the assembling and welding of each of these parts to the others to create a complete body and chassis. Large investments are required in factory equipment and the requisite dies, apart from the logistics and the assembly line to manufacture parts of the body of the vehicle using such methods.

The manufacturing of vehicle body structure by above mentioned method requires many original equipment manufacturers (OEM) suppliers since large number of components are required to be sourced each involving the process of punching, welding, shaping, finishing and very often coloring. Such processes are often not environment friendly and involve wastage of materials by way of scrap. Such manufacturing practices also require large area in assembly line for the assembling of the parts sourced from such OEMs. Apart from the requirement of large area, the time taken for the production of the body structure is also substantially greater in the above mentioned approaches.

Further, the steel or metal body panels tend to deform and dent when struck with anything but the lightest of forces. These vehicle body structures are therefore easily damaged, resulting in high insurance and repair costs.

The other methods for production of body structure for automotive vehicle from polymeric material having an edge over the above mentioned methods with regards to number of OEMs, space required for assembly line and time taken for the manufacturing the body structure.

Over the past few years the Rotational Molding technology has been moving forward at a fast pace. The production of a small size, low cost motor vehicles is made possible by utilizing rotational molding technique. The invention proposed by way of this application realizes the opportunity to produce a one/two/three piece molding body shell that can incorporate the hinge reinforcement, latch reinforcement, instrument panel, cross car beams, seat panel moldings, seat belt anchorage points etc.

Some of the approaches known to us that have improvised plastic body for the automotive vehicles are as follows:

U.S. Pat. No. 7,287,797 filed by Belloso et al. teaches an automotive vehicle body made of interconnected plastic components including a floor module and a metal framework. The framework has elongated longitudinal and transverse structural members of uniform cross sectional configuration. The framework and body are integrated in a manner which minimizes stresses that would otherwise be conveyed to the body from the framework. Though this reference uses an automotive vehicle body of polymeric material manufactured by roto-molding process, a polymer fabrication technology, it uses significant amount of steel and metal framework as a supporting member.

U.S. Pat. No. 5,286,080 filed by Ringdal et al. teaches a method for the manufacture of plastic car bodies, preferably molded or cast in one piece, with openings for doors and windows. To make the body lightweight and as safe as possible, it is assumed according to the invention, that one uses internal roll-over safety bars and a metallic floor frame/chassis, preferably of aluminum. Though the invention proposes the use of molded or casted plastic body it does not eliminate the use of metallic floor frame (chassis) as a supporting member for plastic body structure in an automotive vehicle.

U.S. Pat. No. 6,588,785 by Monary et al. teaches a vehicle, which is specifically adapted to be used as a bumper car. The vehicle is constructed from a frame that allows the vehicle to absorb and deliver impacts in a more efficient manner. The frame is constructed from a rotationally molded impact absorbing plastic. Though the body structures discussed in '785 patent uses polymeric material for manufacturing, but to sustain the load of passengers vehicle has to remain dependent on supporting metal structures like chassis, sub-frame, flooring etc.

In view of the prior art, none discusses the advantages proposed by way of this patent application.

SUMMARY OF THE INVENTION

The present invention relates to automobile industry, more particularly the present invention relates to cost effective, time efficient fabrication of automotive body structure by employing polymeric materials that do not require supporting metal sub-frame for providing desired stiffness, strength and durability to the body of the vehicle. The polymeric vehicle body structure of the present disclosure has sufficient stiffness, strength and durability to sustain the load of vehicle and at the same time eliminate the need of supporting metal sub-frame in the vehicle.

Before the present methods and apparatuses are described, it is to be understood that this invention is not limited to the particular apparatus and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

OBJECTS OF THE INVENTION

The objective of the current invention is to:

Obtain a structure of an automotive vehicle which is made of polymeric materials that do not require supporting metal sub-frame to provide sufficient stiffness, strength and durability to the structure;

Minimize the steps required for manufacturing the structurally complex body parts of the automotive vehicle;

Obtain more economic, eco-friendly and cost effective way of manufacturing and assembling body structure;

Obtain a body structure of an automotive vehicle which is made up of polymeric materials, wherein in situ molding of integrated structures is achieved, thereby reducing the cost of manufacturing and assembling structurally complex body parts of the vehicle;

Obtain a body structure of an automotive vehicle which is made up of polymeric materials which can replace heavier metal structures that requires many parts, multiple steps of manufacturing and stamping;

Obtain a body structure of an automotive vehicle which is made up of polymeric materials which can have inbuilt color thereby eliminating need for painting the vehicle body;

Obtain a body structure of an automotive vehicle which is made up of polymeric materials which achieves reduction in noise and vibrations as compared to structures known in the art;

Obtain a body structure of an automotive vehicle which is made up of polymeric materials which minimizes the number OEM suppliers for the manufacturing of the body structure; and Obtain a body structure of an automotive vehicle which is made up of polymeric materials which takes lesser time and space for manufacturing and assembling process.

An object of the present invention is to provide a structure of an automotive vehicle which is made of polymeric materials obviating the need of supporting metal sub-frame to provide stiffness, strength and durability to the structure.

Another object of the invention is to provide a single step production for manufacturing the structurally complex body parts of the automotive vehicle.

Yet another object of the invention is to provide an economic and cost effective process for manufacturing the body structure of automobile vehicle using the recyclable raw materials, wherein the manufacturing process is flexible and inexpensive and allows for global manufacturing capabilities Yet another object of the invention is to provide an economic and cost effective process for assembling the structure of automobile vehicle that requires less space, time and human resource.

Still another object of the invention is to provide body structures of an automotive vehicle which is made up of polymeric materials, wherein in-situ molding of integrated structures is achieved; thereby reducing the cost of manufacturing and assembling structurally complex body parts of the vehicle.

Still another object of the invention is to provide lightweight body structure of an automotive vehicle which is made up of polymeric materials thereby replacing heavier metal structures that requires many parts, multiple steps of manufacturing and stamping.

Still another object of the invention is to provide class A surfaces of an automotive vehicle having inbuilt color, thereby eliminating need for coloring the vehicle body or parts thereof.

Still another object of the invention is to provide body structure of an automotive vehicle which is made up of polymeric materials thereby achieving reduction in noise and vibration as compared to structures known in the art.

Yet another object of the invention is to minimize the involvement of number OEM suppliers for the manufacturing of the body structure.

Still another object of the invention is to provide a body structure of an automotive vehicle by a manufacturing process which requires zero landfill at manufacturing locations.

In one aspect of the invention, a method is provided for manufacturing passenger vehicle body structure characterized in having no metallized subframe by rotational molding process.

In another aspect of the invention, a passenger vehicle is provided having structure made of polymeric material that did not require supporting metal sub-frame to provide sufficient stiffness, strength and durability to the structure.

In another aspect of the invention, an apparatus is provided for an uniform vehicular body comprising; an upper half body structure with an inner skin, and an outer skin and an lower half body structure with an inner skin and an outer skin wherein the upper half body structure is mounted with the lower half body structure to constitute the body structure.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and product disclosed in the drawings.

DETAILED DESCRIPTION

Figure 1:
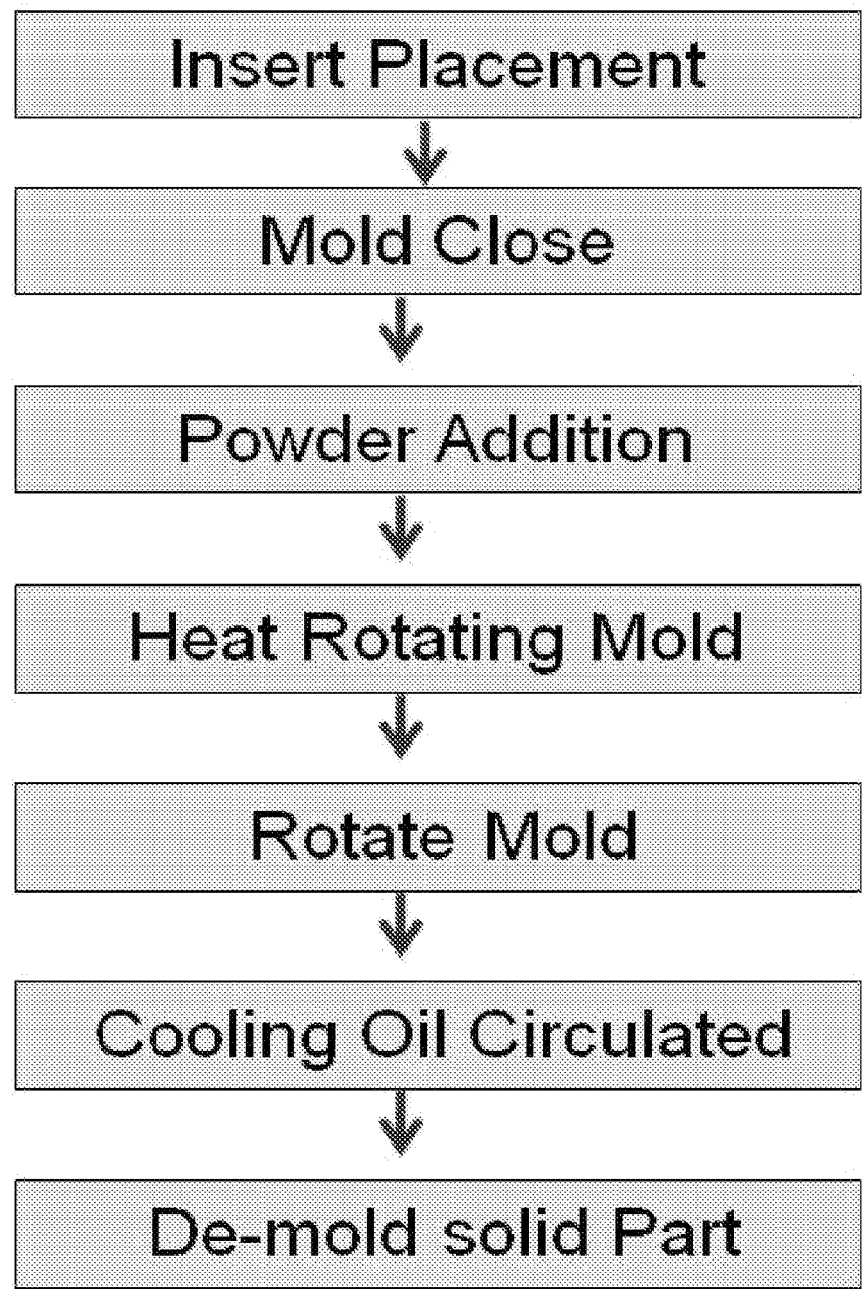
FIG. 1 illustrates the flow chart of the rotational molding process according to one exemplary embodiment of the invention.

Some embodiments of this invention, illustrating its features, will now be discussed:

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems, methods, apparatuses, and devices similar or equivalent to those described herein can be used in the practice or testing of embodiments of the present invention, the preferred, systems and parts are now described.

The disclosed embodiments are merely exemplary of the invention, which may be embodied in various forms.

The term vehicle refer to at least one element that can be selected from the group comprising of motor vehicle, automobile, personal transport vehicle, Automated guided vehicle, or self-propelled machines.

The terms "system", "systems", "components" or "parts" refers to a common term "systems" and essentially mean the same.

The invention provides a load bearing automotive vehicle structure made of polymeric material that does not require supporting metal sub-frame to provide desired stiffness, strength and durability to the structure.

Such a vehicle structure is achieved by the process of rotational molding of the polymeric material. Rotational molding, also known as roto-molding or rotary molding is a molding process for manufacturing of hollow items. The polymeric members can be selected from the group of polyethylene, polyamides and polypropylene polymers, copolymers and blended compositions of the same. The rotational molding process is a high-temperature, low-pressure plastic-forming process that uses heat and biaxial rotation (angular rotation on two axes) to produce hollow, one-piece parts.

The rotational molding process has distinct advantages:
1. Manufacturing large, hollow parts is much easier by rotational molding than any other method.
2. Rotational molds are significantly cheaper than other types of mold.
3. Very little material is wasted using this process, and excess material can often be re-used, making it a very economically and environmentally viable manufacturing process.

The rotational molding can be multilayered and include foam layers to provide multifunctional improvements.

In one embodiment of the invention foam layer is used in creating the body of the vehicle, which is made from High Density Polyethylene; HDPE, will deliver the rigidity and safety. In the multilayered structure of the present invention, the layers adhere to each other to acquire desired stiffness, strength and durability.

The process for manufacturing roto-molded structure by using rotary machine is given below:
  The process starts with an inner and outer aluminum cast mold which is attached to the rotary machine.
  The polymer (e.g. Polyethylene) raw material is poured into the mold in a powder or pellet state.
  The powder or pellets are automatically poured into the mold in measured amounts at precise locations. Meanwhile the castings which have been design with 'heating and cooling channels' running within the casting walls i.e. 'a jacket' is being filled with hot oil at temperatures between 230° C. and 280° C.
  The mold is closed at the same time as the oil reaches its designated temperature. The machine starts to oscillate the mold, to the individual parts calculated speed.
  The heated mold melts the powder and the liquid form now flows to the outside of the mold creating the designed shape and thickness.
  When the cycle has run its course the hot oil is forced out under pressure and is replaced with chilled oil that rapidly cools the part and the mold. The part is then ejected and the cycle is complete.

The process explained above is totally automated and may only need manual intervention to remove the produced product.

The process cycle and demolding temperature are of critical importance. The higher the demold temperature, the shorter the molding cycle time, however, if the demold temperature is too high, some unwanted dimensional changes may occur.

The solidification of molten polymer in the rotomolding process is caused by crystallization during cooling. Polyethylene has a crystallization rate maximum temperature of approximately 110° C. This value does not capture a process that occurs measurably over a wide range of temperature (60-120° C.), and continues at room temperature, albeit at a slower rate, over several days after molding. This results in further minor shrinkage which can lead to warpage. Thus the demolding temperature is of critical importance. The higher the demold temperature, the shorter the molding cycle time, however, if the demold temperature is too high, some creep may occur. A newly molded part will need to be cooled further and stored in a supporting fixture to prevent dimensional changes. Accordingly, subsequent assembly operations will need to be postponed for 24-48 hrs after molding. This also implies that a large storage area near the machine will be needed.

According to preferred embodiment of the invention a method is provided for manufacturing passenger vehicle body structure characterized in having no metallized sub-frame by rotational molding process is described as follows:
1. A charge of a thermoplastic polyethylene resin, usually in the form of a powder, is added to a mold which is closed and mounted in a large holding frame. The mold is typically machined from aluminum and is made to high precision for good part surface quality. The mold is subjected to bi-axial rotation to uniformly distribute the resin.
2. Hot oil heats the tool causing the resin to melt and assume the geometry of the mold.
3. Subsequent cooling and solidification of the part allows for demolding.
4. Since no pressure is applied, a suitably low melt viscosity (Melt flow index, MFI>3 g) is a critical material requirement in allowing the molten polymer to flow in the mold. A higher MFI facilitates increased flow and a potentially shorter cycle time, however, this would be countered by reduction of some key properties and performance.

FIG. 1 illustrates the flow chart of the rotational molding process according to one exemplary embodiment of the invention.

In one embodiment of the invention the surface quality that can be produced from the rotomolding process is the equivalent of 'Class A' body panels.

In one embodiment of the invention colour can also be added in the step when Polyethylene raw material is poured. The plastic body panels (polymeric materials) are dent and rust resistant but lack the structural strength of steel panels, in one embodiment of the invention by way of reinforcement with fiberglass or other high modulus fibers, plastic panels achieve considerably greater strength. Another technique for increasing the strength and stiffness of plastic automotive panels is to incorporate a reinforcing foam structure into the interior surface or core layer of the panel.

In yet another embodiment of the invention includes a crash zones around and within the double skin wall thicknesses could develop to provide additional strength at desired places in the vehicle body.

In a preferred embodiment of the invention the vehicle body is designed to have a body lower and upper as two separately molded parts though a single one part molding cannot be ruled out. In yet another aspect, the Mold and molding machines used in the invention are interchangeable and a mold change can be achieved in approximately 45-60 minutes.

In yet another embodiment of the invention the process allows for robotic placement of the inserts.

Figure 2:
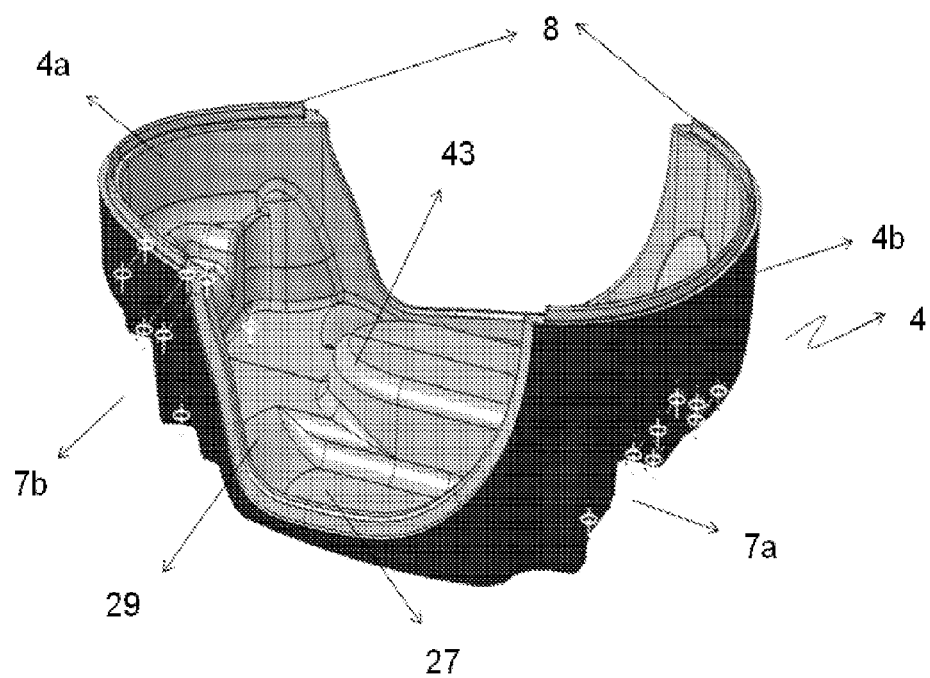
FIG. 2 shows a lower half part of the automotive vehicle structure according to one exemplary embodiment of the invention.

FIG. 2 shows a lower half part of the automotive vehicle structure according to one exemplary embodiment of the invention.

According to preferred embodiment of the invention a lower half body structure 4 is manufactured in such a way that it should be able to sustain the weight of one to four passengers without requiring any supporting metal structure.

The lower half body structure 4 comprises inner skin 4a, outer skin 4b and a foam filled (not shown) in between two skins of lower half body structure 4 to provide the said structure required stiffness, strength and durability. The lower half body structure 4 also has structural provision to attach rear wheel assembly 7a, structural provision to attach front wheel assembly 7b, front tunnel 43, still section 27 and forward floor 29 optimized structurally. The lower half body structure 4 has a raised securing element 8 used in securing said lower half body structure 4 with upper half body structure 6.

Figure 3:
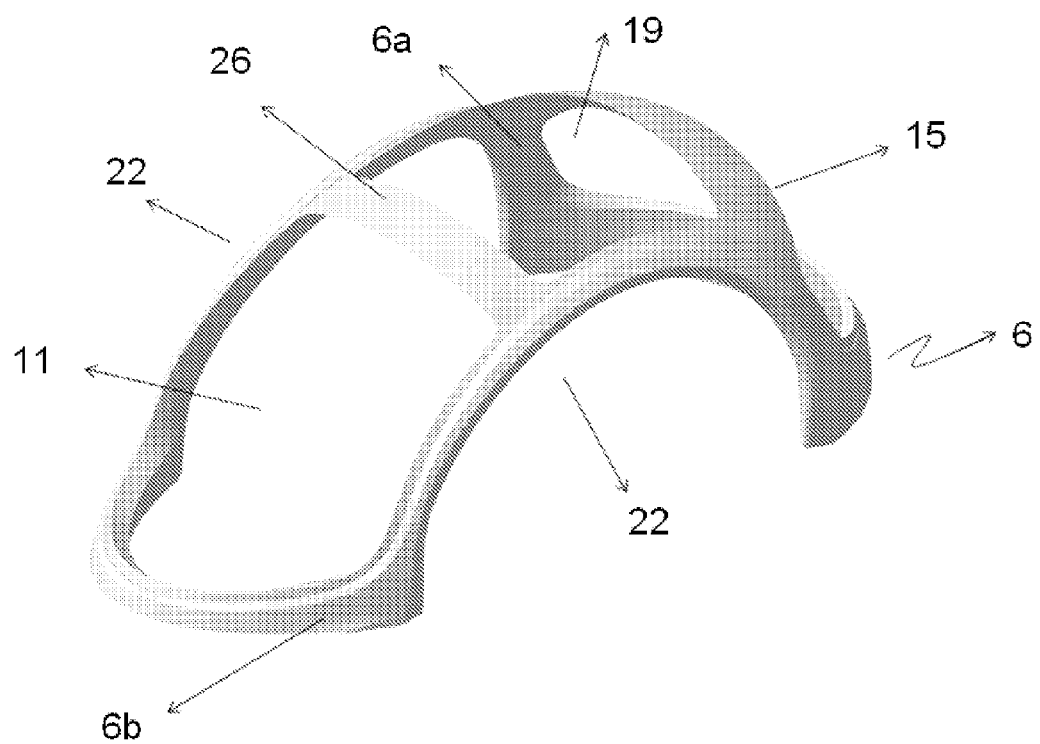
FIG. 3 shows an upper half part of body structure of the automotive vehicle structure according to one exemplary embodiment of the invention.

As illustrated in FIG. 3, upper half body structure 6, manufactured in identical manner as of lower half body structure 4 that is by rotational molding process. The upper half body structure 6 also uses foam layer (not shown) to strengthen the structure and to reduce the noise in between inner skin 6a and outer skin 6b. The upper half body structure 6 has multiple openings for different components of the automobile vehicle to fit into. An opening for front glass 11, opening for top glass 19 and opening for rear glass 15 is provided to fix respective glasses (wind shields) onto the upper half body structure 6. Openings for doors 22 are provided to attach doors onto the body structure of the automotive vehicle. A header 26 is optimized onto the upper half body structure 6 in such a way that it provides maximum upward vision to the driver of the automotive vehicle.

Figure 4:
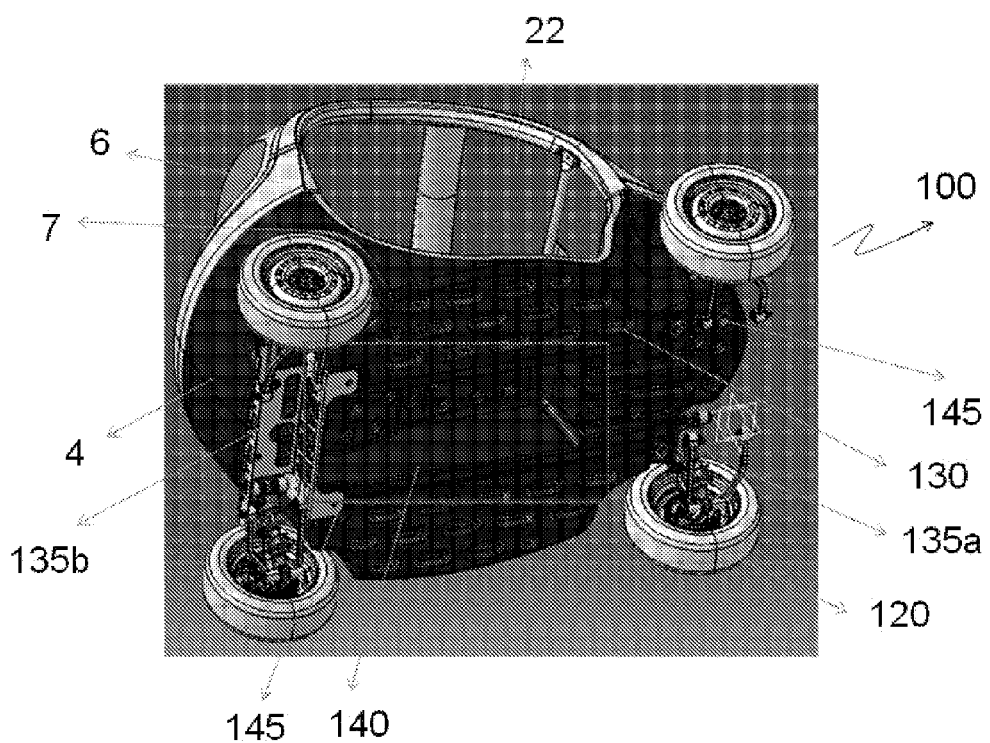
FIG. 4 illustrates a bottom view of the body structure after joining upper and lower half structure according to one exemplary embodiment of the invention.

As illustrated in FIG. 4 illustrates a body structure 100 obtained after joining or fixing lower half body structure 4 with upper half body structure 6. The FIG. 2 also shows some additional components like wheels 120 front cross member assembly 135a and rear cross member assembly 135b along with bolts 145. The body structure 100 has a provision for placing battery 140, wherein a battery utilized to provide voltage for the operation of the automotive vehicle can be fixed. In the body structure 100, the lower half body structure 4 has grooves and slots 130 also known as "Kissoffs" designed and placed in such a way that they provides additional stiffness, strength and durability to the lower half body structure 4.

Figure 5:
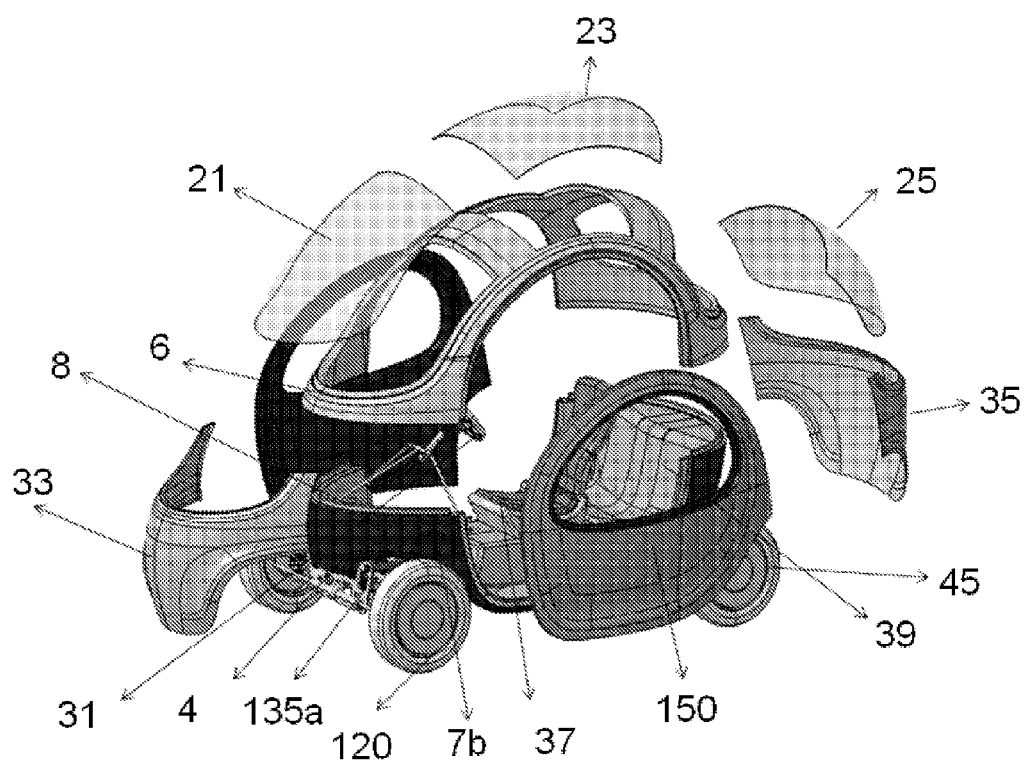
FIG. 5 illustrates an exploded view of the automobile vehicle.

An exploded view of all components of an automobile vehicle is shown in FIG. 5. The lower half body structure 4, upper half body structure 6, raised securing element 8, doors 150, front seat 37, rear seat 39, parking brake 45, front bumper 33, rear bumper 35, front cross member assembly 135a, wheels 120, steering 31, structural provision to attach front wheel assembly 7b, front glass 21, top glass 23 and rear glass 25 are shown in the exploded view.

Figure 6:
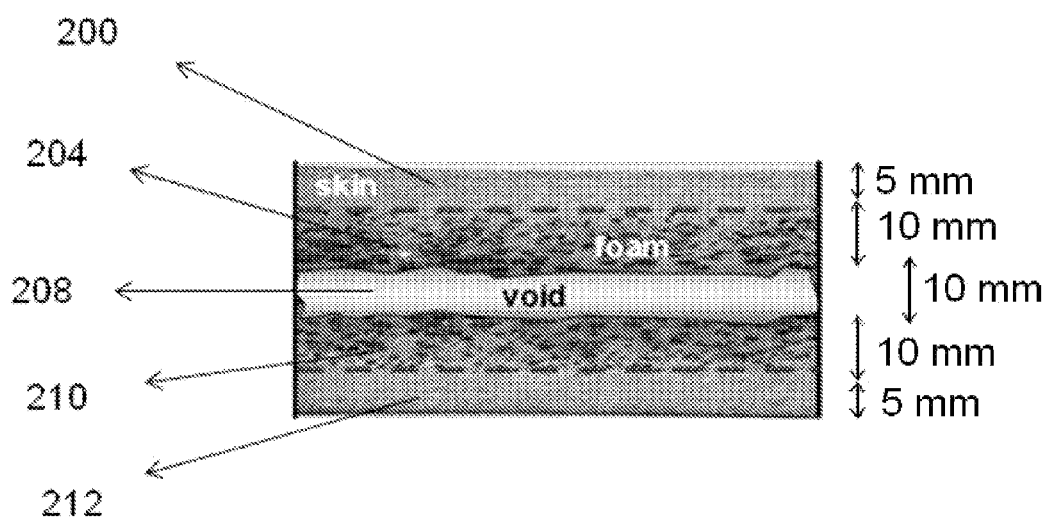
FIG. 6 illustrates a cross sectional view of multi-layered body structure of the vehicle in accordance with an exemplary embodiment of the invention

As shown in FIG. 6, the lower half body structure 4 and upper half body structure 6 will each be molded to have a skin or shell (approximate thickness 4-5 mm) enclosing inner layer of foam. The outer skin 200 is of 5 mm, the first foam layer 204 is of 10 mm size, the void space 208 (air) is of 10 mm, the second foam layer 210 and inner skin 212 is of 5 mm thickness. The minimum thickness of the complete section will be 40 mm and the nominal foam thickness is 10 mm. Complete foam fill is to be avoided to allow powder flow of the foaming material and the formation of a complete uniform foam layer throughout the part. For a given overall part design and polymer material and its properties, the dimensions of this cross-section, its uniformity and the foam layer density will determine the mechanical performance of the body structure. These parameters are all capable of being carefully controlled in the manufacturing process. The required foam density will be 200 to 500 Kg/m3 (c.f. HDPE 954 Kg/m3) is currently specified. The purpose of the foam is to provide additional mechanical performance (stiffness, impact strength) at reduced mass and to impart some sound and vibration insulation. The intent is that the HDPE chosen for the body shell sections will also be suitable as the base resin for the foam layers. The foaming HDPE will require foaming agents (thermally activated compounds, e.g. azodicarbonamide, that decompose>180° C. to form nitrogen gas) to be incorporated during the melt compounding process. Additionally, melt viscosity controls foam uniformity and structure. Since the foam will be polyethylene based, it will have no difficulty adhering to the HDPE shell, however, HDPE has a very low surface energy and consequently it is very difficult to adhere it to non-HDPE materials. The material tolerance is 0.01 mm per meter.

Figure 7:
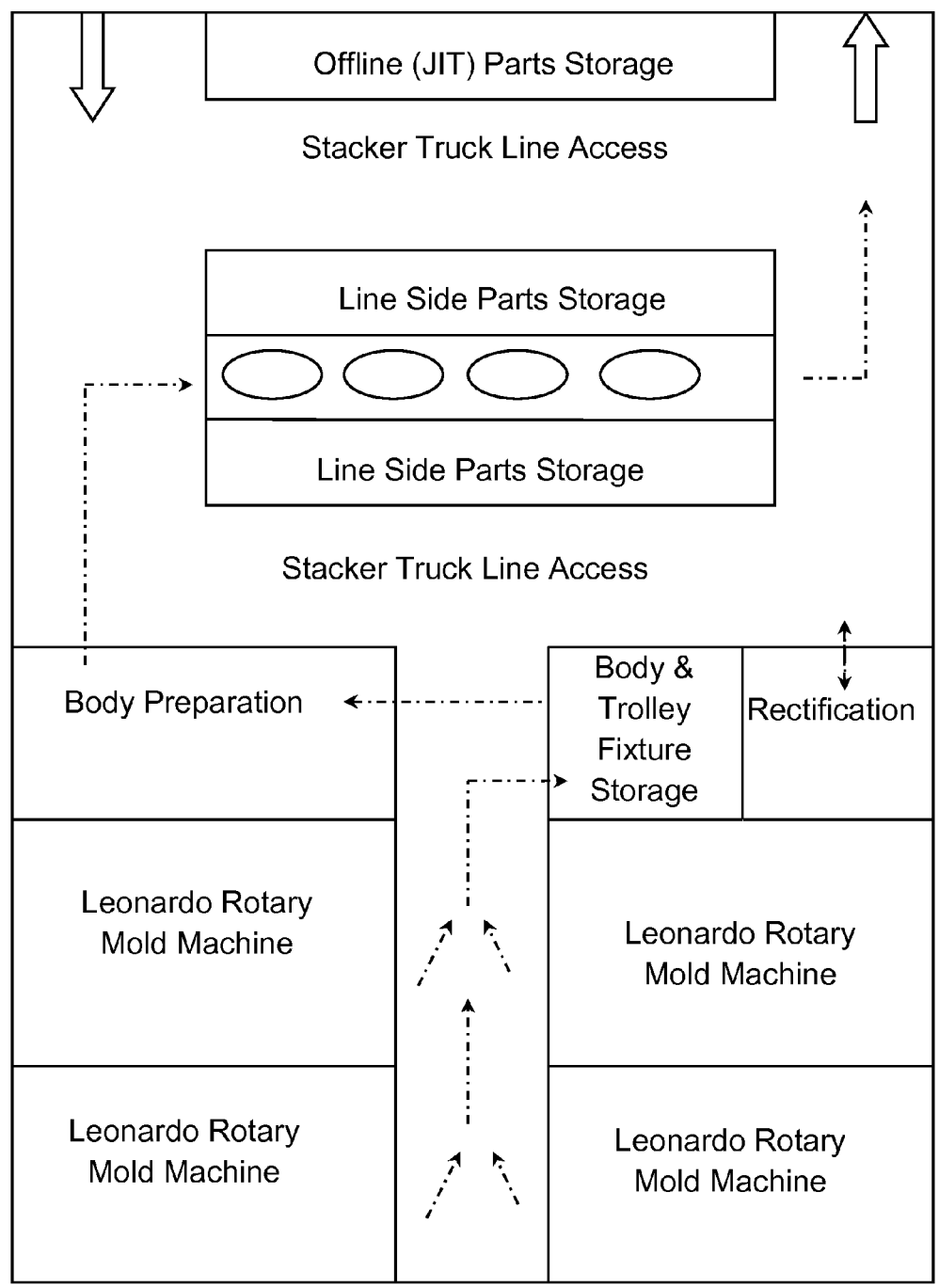
FIG. 7 shows an arrangement of components in an assembly line for manufacturing the automotive vehicle.

FIG. 7 shows an arrangement of components in an assembly line for manufacturing the automotive vehicle.

Figure 8:
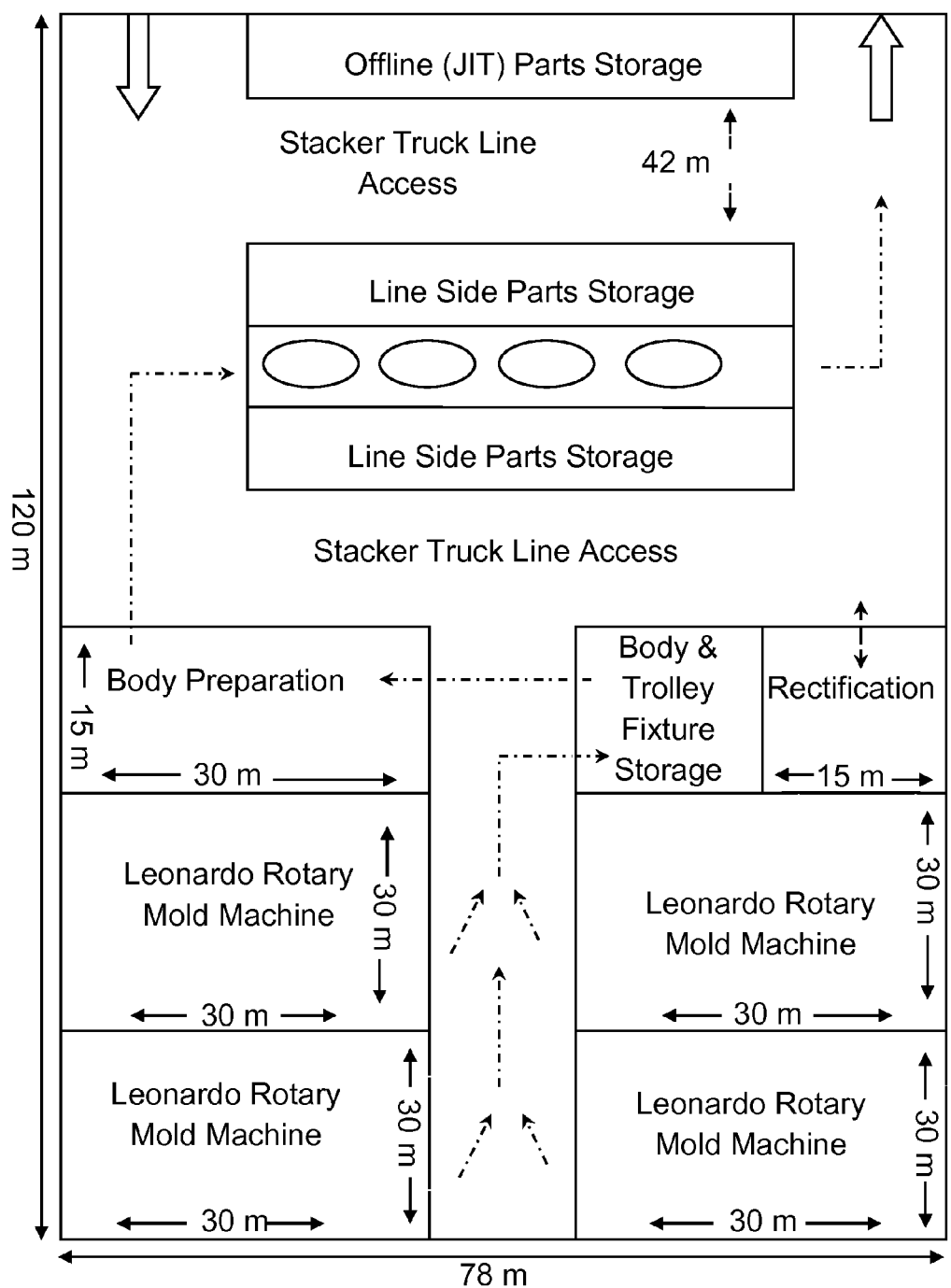
FIG. 8 shows the dimensions required for arrangement of components in the assembly line for manufacturing of the automotive vehicle according to one exemplary embodiment of the invention.

FIG. 8 shows the dimensions required for arrangement of components in the assembly line for manufacturing of the automotive vehicle according to one exemplary embodiment of the invention.

Figure 9:
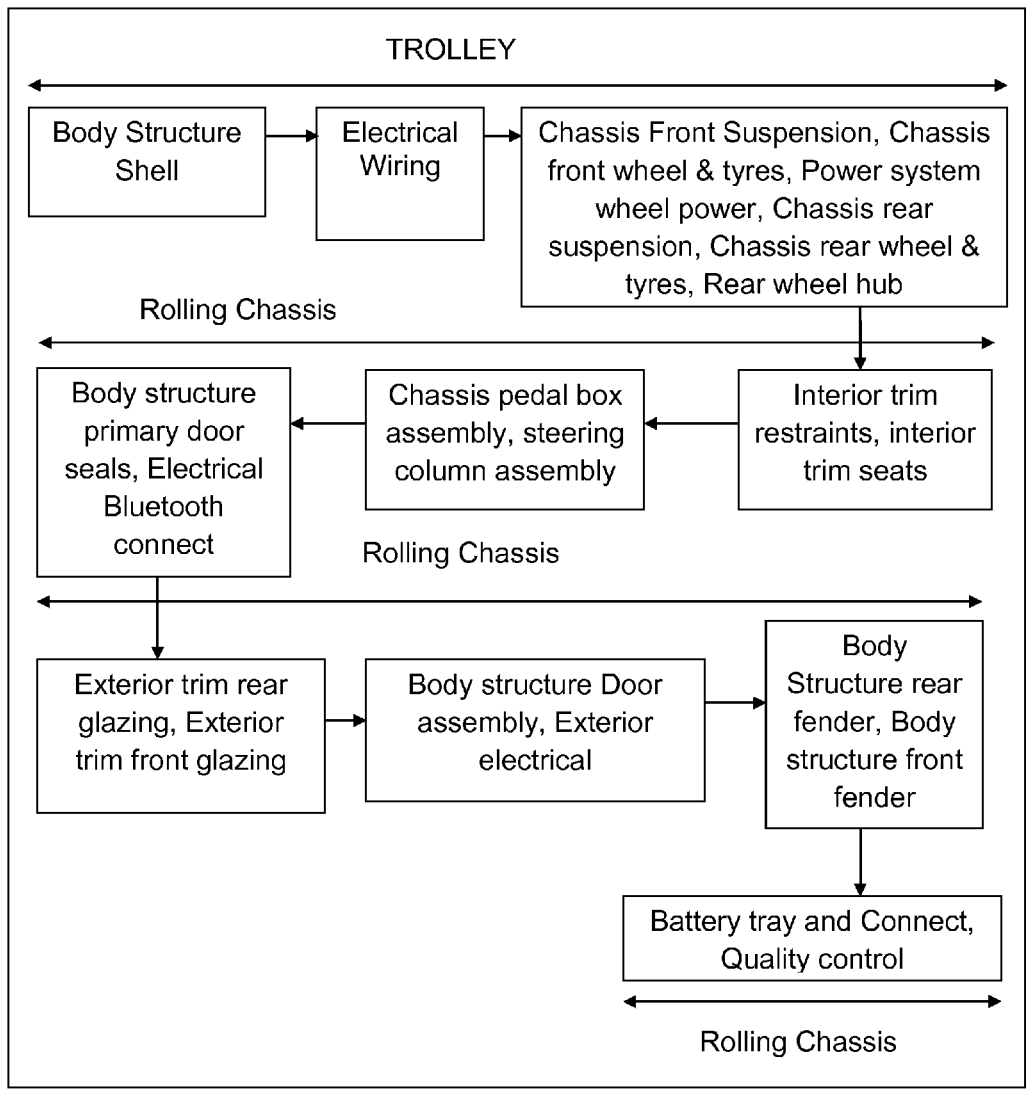
FIG. 9 shows the trim and final assembly process.

FIG. 9 shows the Trim and Final assembly process. The body shell would be connected to a trolley fixture off line and wheeled manually onto the production line, which is a simple 'U' frame channel in which each wheel will run along. In the middle of the channel will be a simple pulley that controls the line speed (similar to a car wash). After station 3 when the chassis and wheels are fitted the Vehicle runs on its own wheels. At the end of the line the batteries are fitted and the vehicle drives away under its own power.

According to another embodiment of the invention the logistics strategy of manufacturing the body structure can be the following:

Parts made locally, shipped in and sub assembled on site
Parts made on site and sub assembled on site
Sub Assemblies shipped in from main supplier
All parts shipped in will be to accommodate a Just in Time (JIT) strategy According to another embodiment of the invention fabricated rigid foam are used for stacking of parts to enable non-contact stacking The internal foam layer is made of the same material as that of base material. The internal foam layer 204 and 210 in the roto-molded body structure is used to provide following advantages over existing technologies:

Increased stiffness
Insulation from vibration
Impact dampening and sound absorption The improvements listed above are accrued by using lightweight foam layers. The enhancement in strength and durability are the result of being able to mold thick polymer sections of a tough and durable high density polyethylene material.

Figure 10:
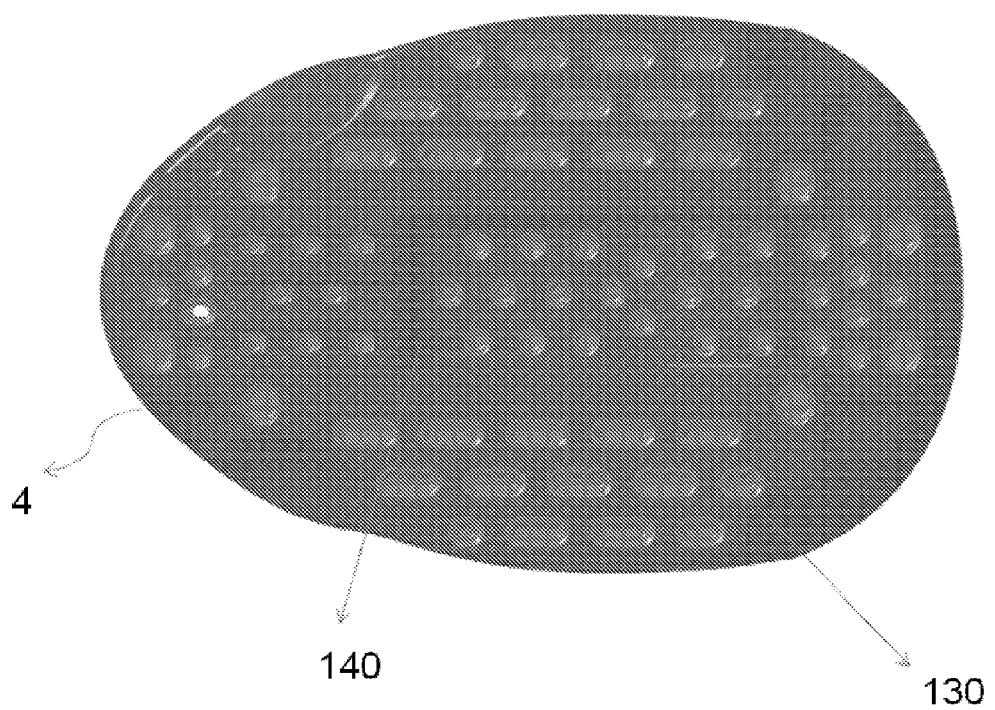
FIG. 10 shows the bottom view of the lower half body structure

FIG. 10 shows the bottom view of the lower half body structure 4. The figure also illustrates an exemplary arrangement of "Kissoffs" 130, in the lower half body structure 4. This "Kissoffs" impression in the structure reduces material required for the manufacturing of the lower half body structure 4. This particular arrangement of "kissoffs" plays a key role in providing desired stiffness, mechanical strength and durability to the lower half body structure 4 in such a way that the lower half body structure 4 obviates the need for additional supporting metal frames.

Figure 11:
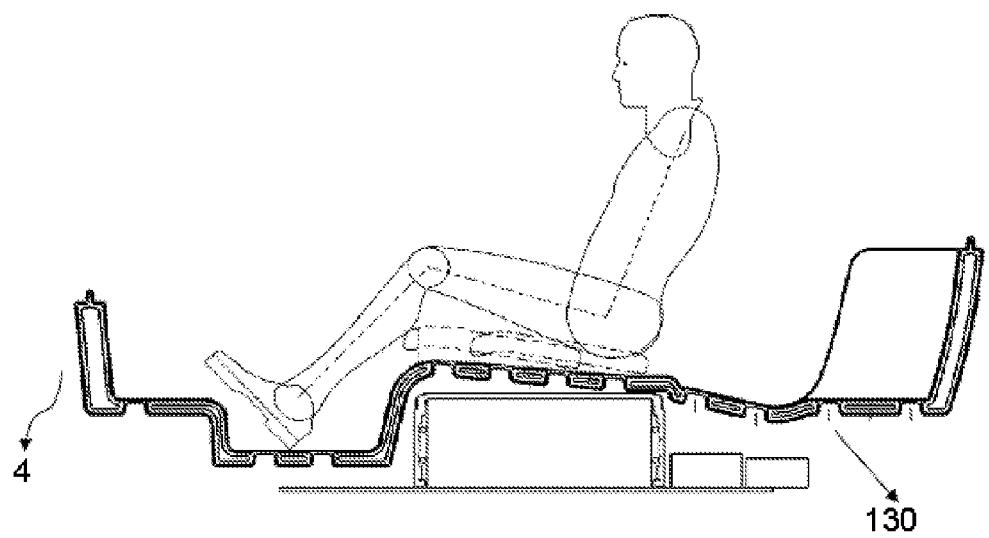
FIG. 11 illustrates the sectional view of the lower half body structure

The sectional view of the lower half body structure 4 is illustrated in FIG. 11. The provision for the front seat 37 and rear seat 39 is as illustrated.

Materials: Requirements and Performance

According to another embodiment of the invention the performance of a molded plastic part is a combination of material properties and the processing conditions it was exposed to. More than 90% of the polymers used in rotomolding are from the polyethylene family. The remaining volume is made up principally of polypropylene (PP), polyamide and polycarbonate. Although the initial focus is concentrated on HDPE, there may be potential for PP based materials to be used in components such as the door and body upper. Within the polyethylene family, High Density Polyethylene (HDPE) is available in grades that are manufactured specifically for rotomolding large parts that need high tensile strength and high flexural modulus; >1000 MPa. HDPE has many desirable properties as noted below:

Good solvent and chemical resistance
Toughness (high impact strength at low temperature −30° C.)
Easily recycled The material supplier transforms the melt compounded material (HDPE plus pigments and stabilizers) by cryogenic grinding into a powder (Avg. particle size<600 microns). HDPE is degraded by exposure to ultra-violet light (UV); however, stabilizer compounds are added to fight this deficiency and the body parts exposing to direct sunlight may be covered by a UV resistant decorative skin or pre-painted film.

Material Development and Tuning

According to another embodiment of the invention the HDPE formulations have been specially developed for optimum performance. The polymer blends based on HDPE and polyamides (e.g. PA-12, PA-11) has been considered. Fine Tuning of the material to facilitate a successful product and address performance issues is used to address the vehicle needs. This includes:

Addition of anti-static additives to improve surface appearance. Addition of a stabilizer package to provide appropriate UV protection.
Additives to improve scratch and mar resistance.

A listing of typical HDPE properties in shown in the Table Below:

| Property | Units | Value |
| --- | --- | --- |
| Tensile yield strength | MPa | 21.4 |
| Tensile Elongation (break) | % | 300 |
| Flexural modulus | MPa | 1170 |
| Flexural Yield Strength | MPa | |
| Impact Strength; (−40 C.: 3.18 mm) | J | 91 |
| Creep | | |
| Melt Flow Index | g/10 min | 4 |
| Melting Temperature | ° C. | 130-135 |
| Crystallization Temperature | ° C. | |
| Heat of Fusion | J/g | 245 |
| Heat Deflection Temperature | ° C. | 80 |
| Coeff of Thermal Expantion | ppm/c | 120 |
| Volume shrinkage | % | 2 to 3 |

According to another embodiment of the invention FIG. 8 shows the dimensions required for arrangement of components in the assembly line for manufacturing of the automotive vehicle according to one exemplary embodiment of the invention. It is based on 4 machines with each having a recommended 30 m square footprint. The footprint has been designed for a process flow of limited movement of material. If 6 or 8 machines are required then in process terms they will fit directly onto the end, in reality they will be designed around the manufacturing site available. The bodies coming from the molds will be placed onto a trolley fixture and pushed to the body storage area, and then they will stand in this area to cool down. They will then be pushed to the body preparation area where they will be prepared for the main production line (this area may not be required). The body fixture is manually pushed onto the production line where it engages the grab. Station 3 where the change over takes place between the trolley and the vehicles own wheels is under review, and will possibly change during the prototype design. The majority of parts will come in as sub assemblies and will arrive as a JIT process circa 30 minutes before needed; however a small off line parts storage has been allowed for. The vehicles when exiting the production line will be driven away to an outside park, but a small rectification area has been allowed for.

According to another embodiment of the invention the production intent is to incorporate recycled content into the initial HDPE compounding/rotomolding processing step. This material will be supplied as post industrial or post consumer scraps. The quantity that will be included as recycled content will be 1-30 wt. %. Material usage in the manufacturing process is predicated to produce zero landfill; all waste will be incorporated into the original application. The terms recycling and recyclable have been open to different interpretations. The European Union has been the most active in defining the various terms and guiding future legislation According to another embodiment of the invention the re-use of industrial scrap from the in-house waste stream can be achieved several ways, however, for recycled content to be part of the materials strategy; the waste must be converted into powder form. Hence the recycling has to be done by addition to the virgin polymer prior to cryogrinding. This kind of recycling is termed "Closed Loop" recycling and depending upon the condition of the recycled material, is usually incorporated into the virgin resin in the 1-15 wt % range. In-house HDPE waste will be an inseparable mixture of the shell HDPE and foam HDPE. An attractive option is for all waste material to be added to the foaming HDPE resin. Hence all the exterior HDPE will be composed of 100% virgin material.

According to another embodiment of the invention the machine footprint for the body structure of the vehicle size would be approx 30 m×30 m, including at the machine raw material handling capabilities. The site will have a central polymer delivery/storage farm with a distribution network. The raw powder has a bulk density of approximately 360 Kg/m3; 22.5 lbs/cu. ft. such that a seven day material supply; a separate storage container will be needed for storing the foaming HDPE (powder) raw material.

According to another embodiment of the invention, the invention may find its application in number of fields where a light weight, small size vehicle is desired. Some of the exemplary fields are sports vehicles and carts, mail delivery vehicles, service vehicles for housing complexes, military training camps, airport and transportation support activities, resorts etc.

The preceding description has been presented with reference to various embodiments of the invention. Persons skilled in the art and technology to which this invention pertains will appreciate that alterations and changes in the described systems, apparatuses, devices and methods of operation can be practiced without meaningfully departing from the principle, spirit and scope of this invention.

Advantages of the Invention

Single step production of structural complex shaped body parts for automotive applications, thereby reducing manufacturing cost.

Structure do not require additional supporting metal subframe. The polymeric structure itself has desired stiffness, strength and durability, hence light weight vehicle structure can be obtained.

Body structure of an automotive vehicle which is made up of polymeric materials, wherein in-situ molding of integrated structures is achieved, thereby reducing the cost of manufacturing and assembling structurally complex body parts of the vehicle.

The Body structure of the invention can replace heavier metal structures that require many parts, multiple steps of manufacturing and stamping.

An economic and cost effective process for assembling the structure of automobile vehicle.

The body structure of an automotive vehicle which is made up of polymeric materials which can have inbuilt color there by eliminating need for coloring the vehicle body.

The body structure of the invention achieves reduction in noise as compared to structures known in the art.

The body structure of the invention achieves reduction in vibration.

The body structure of the invention minimizes the number OEM suppliers required for the manufacturing of the body structure.

The body structure of the invention takes lesser time for manufacturing and assembling process.

We claim:

1. An apparatus for a non-metalized uniform polymeric vehicular body (10) comprising:
    an upper half body structure (6) with an inner skin (6a), and an outer skin (6b); and
    a lower half body structure (4) with an inner skin (4a) and an outer skin (4b), wherein the lower half body structure (4) is provided with grooves and slots (130), wherein the upper half body structure (6) is mounted with the lower half body structure (4) to constitute the non metalized uniform polymeric vehicular body (10).

2. The apparatus for the non-metalized uniform polymeric vehicular body (10) of claim 1, further comprises at least one layer of foam (210), (204) disposed on the inner skin (6a), (4a), and the outer skin (6b), (4b) having a void (208) between.

3. The apparatus for the non-metalized uniform polymeric vehicular body (10) of claim 1, wherein the upper half body structure (6) and lower half body structure (4) is manufactured from a material selected from a group consisting of High Density Polyethylene, polypropylene, polyamide or polycarbonate.

4. The apparatus for the non-metalized uniform polymeric vehicular body (10) of claim 1, wherein the outer skin (6b), (4b) and the inner skin (6a), (4a) is having a thickness of at least 5 millimeter.

5. The apparatus for the non-metalized uniform polymeric vehicular body (10) of claim 1, wherein the at least one layer of foam (210), (204) is having a thickness of at least 10 millimeter to provide mechanical performance at reduced mass and to impart sound and vibration insulation.

6. The apparatus for the non-metalized uniform polymeric vehicular body (10) of claim 1, wherein the void (208) is having thickness of at least 10 millimeter.

7. The apparatus for the non-metalized uniform polymeric vehicular body (10) of claim 1, further comprises of an additive added to the High Density Polyethylene selected from a group consisting of polyamides or polypropylene.

8. The apparatus for the non-metalized uniform polymeric vehicular body (10) of claim 1, further comprises at least one layer of foam (210), (204) disposed on the inner skin (6a), (4a), and the outer skin (6b), (4b) having a void (208) between having a foam density about 200 kg/m3 to 500 kg/m3.

\* \* \* \* \*